United States Patent [19]

Fleischer

[11] Patent Number: 5,331,120

[45] Date of Patent: Jul. 19, 1994

[54] METHOD FOR ACOUSTIC ABSORPTION

[75] Inventor: Robert L. Fleischer, Schenectady, N.Y.

[73] Assignee: General Electric Company, Schenectady, N.Y.

[21] Appl. No.: 90,679

[22] Filed: Jul. 13, 1993

[51] Int. Cl.$^5$ ............................................... F16F 7/00
[52] U.S. Cl. ................................... 181/207; 181/208; 181/294; 181/296; 148/437
[58] Field of Search ............... 181/207, 208, 286, 294, 181/296; 148/437, 438, 441, 442

[56] References Cited
U.S. PATENT DOCUMENTS 4,650,528  3/1987  Masumoto et al. ................. 148/437

*Primary Examiner*—Michael L. Gellner
*Assistant Examiner*—Khanh Dang
*Attorney, Agent, or Firm*—James Magee, Jr.

[57] ABSTRACT

A method and article for damping acoustic energy caused vibrations comprises forming a damping surface comprising an alloy containing from about 13.5 to about 24.5 atom percent tin with the balance being essentially titanium or a titanium-chromium alloy containing from about 52 to about 56 atom percent chromium, about 8 to about 12 atom percent aluminum, and the balance essentially titanium.

7 Claims, No Drawings

METHOD FOR ACOUSTIC ABSORPTION

Preferred alloys having the ability to absorb acoustic energy are described below.

TABLE I

| Nominal Atomic Composition | Measured Atomic Composition | Melting Temp. (°C./h) | Specific Gravity | Heat Treatment (°C/h) | Phases Expected Volume Fraction | Volume Fractions Observed (100 Points Counted) |
|---|---|---|---|---|---|---|
| $Ti_{80}Sn_{20}$ | 79:21 | 1590 | 5.76 | 1350/20 | 0.79 $DO_{19}$; 0.21 A3 | 0.79; 0.21 |
| $Ti_{78}Sn_{22}$ | 78:22 | 1590 | 5.82 | 1350/20 | 0.89 $DO_{19}$; 0.11 A3 | 0.90; 0.10 |

This invention is directed to absorption of mechanical energy and more particularly to damping or attenuation of acoustic energy in high and low frequency ranges and to materials and apparatus for absorbing and reducing emission and reflection of acoustic energy.

BACKGROUND OF THE INVENTION

Mechanical damping of acoustical energy is of interest and can be used in many practical applications such as minimizing noise that is distracting or harmful, minimizing vibrations that are damaging to sensitive equipment, and for reducing unwanted acoustic reflections and emissions.

Increased speed of modern machinery and moving parts thereof causes an increase in undesirable vibrations and increases the danger of failure. Another problem particularly associated with modern equipment is the danger of harmful noise the intensity of which is increasing with the growing number of high speed industrial machinery.

The damping or attenuation of acoustical energy is important at both low frequencies from about 0.01 to about 10 Hz and at higher frequencies in the range of 5 to about 20 mHz. Damping or attenuation is the ability of solids to dissipate the energy of mechanical vibrations in materials of construction. Damping capacity is an important property which must be considered in connection with other physical and mechanical properties and characteristics of the materials.

A number of metal alloys have long been known for their ability to attenuate to acoustical energy. These include a variety of molybdenum alloys, copper-zinc alloys, and certain manganese-copper alloys.

BRIEF DESCRIPTION OF THE INVENTION

It has been discovered that certain titanium-tin alloys can be used to dampen or attenuate acoustical energy and that these alloys have other properties which make them valuable as structural materials. Articles made of or coated with the alloys disclosed are able to reduce passage reflection and emission of acoustical energy in both low and high frequency ranges.

DESCRIPTION OF THE INVENTION

The alloys useful in the practice of this invention are titanium-tin alloys comprising from about 13.5 to about 24.5 atom percent tin, the balance being essentially titanium and titanium-chromium-aluminum alloys comprising about 52 to about 56 atom percent chromium, about 8 to about 12 atom percent aluminum, the balance essentially titanium.

Other metals particularly vanadium in amounts up to about 4 atom percent can be alloyed with the basic titanium-tin composition.

These alloys can be formed in suitable shapes and configurations having damping surfaces by conventional metal forming techniques and equipment.

Samples were arc-melted into disk-shaped ingots using as high-purity components as were reasonably available. Titanium was 99.99% pure and tin >99.999%. Purities of other elements were (Al) 99.9999%, (Cr) 99.99%, (Nb) 99.99% and (V) 99.9%. Interstitials in wt. ppm were (C) 100, (N) 15 and, (O) 500 for $Ti_{80}Sn_{20}$ and (C) 100, (N) 25, and (O) 1000 for $Ti_{78}Sn_{22}$. Samples were annealed at 1350° C. in Ar-filled $SiO_2$ ampules that included a small piece of Y to getter oxygen. Some hardness results were reported. Microhardness was measured up to 1150° C. using a Nikon-GM tester, a diamond pyramid indentor, and a load of 1000 or 500 g. The gas pressure during testing is typically less than $10^{-8}$ atmospheres.

The expected phases and melting temperatures for both compositions are listed in Table 1, along with the observed phase fractions using point counts on photographs of polished metallographic sections.

The samples tested for damping were electro-discharge machined to approximately 4.0×1.0 ×0.1 cm. The damping measurements were carried out at frequencies between 0.01 and 10 Hz and temperatures from −30° C. to 100° C. The damping capacity and Young's modulus were measured with a Polymer Laboratories Dynamic Mechanical Thermal Analyzer using a fixed-guided cantilevered test configuration.

The damping capacity was measured by applying a small sinusoidal mechanical force and by measuring the displacement of the sample. The phase angle δ, of the lag between the applied load and the measured displacement was calculated. The tangent of δ is a measure of the damping capacity, commonly called the loss factor. Comparison of the amplitude of the load and displacement signals yielded Young's modulus, E'. All samples were tested at three distinct frequencies of vibration: 0.1, 1, and 10 Hz. The dependence of tan δ and E' on temperature was determined by vibrating the samples at 100 microstrain (maximum) while increasing the temperature 1° C. per minute from −30 to 100° C. and continually alternating the frequencies. The run was then repeated to check for consistency. The dependence of the damping capacity on the strain was found by measuring the damping capacity at 25° C. while continually alternating the frequencies and periodically increasing the amplitude of the vibration. The reported values are the average of the damping capacity over thirty minutes.

The values of E' were corrected to account for error which arose from end-effects at the clamping point of the beam. These effects are due to the uncertainty in the point at which the metal starts to bend in the grips. These "end corrections" are based on the measured modulus and are calculated from an empirically generated curve. Corrections to the tan δ values were made to account for the friction between the air and the moving sections of the DMTA, including the sample, as the sample was vibrated. The correction factor is frequency-dependent, and for measured values of the loss factor below 0.01, it was necessary to correct the 10 Hz data. This was done by averaging the loss-factor data values over a temperature range in which the tan δ was nominally flat. The average of the 1-Hz tan δ data was subtracted from the average of the 10-Hz tan δ data and that number was then subtracted from the 10-Hz tan δ values over the whole temperature range.

In addition to microhardness tests, a 1.0×1.5-×0.5-cm sample of $Ti_{78}Sn_{20}$ was compressed at a strain rate of $10^{-4}s^{-1}$ first to a strain ε of 3.1% and subsequently to incipient failure to determine the stress-strain behavior at ambient temperature. Metallographic and transmission electron microscopic examinations were done on both deformed (ε=3.1%) and as-annealed material.

Damping capacity measurements at low frequency revealed a peak in the damping capacity near 20° C. at 0.1 Hz, 30° C. at 1 Hz and 35° C. at 10 Hz for a $Ti_{78}Sn_{22}$ sample and near 15° C. for all three frequencies in a $Ti_{80}Sn_{20}$ sample. The amplitude of the damping capacity peaks decreased with increasing frequency in both samples, from a loss factor of 0.04 at 0.1 Hz to 0.017 at 10 Hz in the $Ti_{78}Sn_{22}$ sample and from a loss factor of 0.025 at 0.1 Hz to 0.015 at 10 Hz for the $Ti_{80}Sn_{20}$ sample. Data from a second run on each sample closely repeated these values. The modulus decreased with increasing temperature until 40° C. in the $Ti_{78}Sn_{22}$ sample and 35° C. in the $Ti_{80}Sn_{20}$ sample and then increased. An abrupt increase near the damping capacity peak in the $Ti_{80}Sn_{20}$ in both runs was noted.

Deformation markings on a mechanically polished external surface of a compression sample after a true plastic strain of 0.031 showed prominent deformation bands at high and low magnification. Deformation proceeds commonly on more than one plane. The dominant slip at room temperature is prismatic with a [0001] slip vector, and only four independent slip systems normally act. Transmission electron microscopy (TEM) of undeformed $Ti_{78}Sn_{22}$ and $Ti_{80}Sn_{20}$ confirmed that the expected equilibrium phases were present, hexagonal Ti in a matrix of the ordered hexagonal intermetallic compound $Ti_3Sn$.

Fine-scale twinning on pyramidal $\{10\bar{1}0\}$ planes was observed first in the undeformed sample and more abundantly present after a strain of 0.031. Typical twin widths were 17±5 nm in the undeformed sample and 13±6 in the deformed one, i.e., not meaningfully different. The ordered phase also showed high grown-in dislocation densities in some areas.

The two alloys that were shown here to have low-frequency damping have three other properties in common, high mHz attenuation, misshapen hardness indentations, and fine-scale twinning.

Table 2 shows some titanium-intermetallic-based alloys in a sequence of descending Young's moduli (E). Blank lines indicate where attenuation of megahertz elastic waves prevented measurement of E. Values where asterisks appear were derived from the low-frequency measurements, which have been done on two of these alloys. All alloys on the list are two-phase except $Ti_3Sn$.

Of the five alloys with the high mHz attenuation, four have odd hardness impressions; only one of the six samples with the lowest moduli has normal indentations. From this list $Ti_{75}Sn_{21}V_4$ and $Ti_{72}Sn_{78}Al_{10}$ would be the prime candidates as further alloys to study, followed by $Ti_{36}Cr_{54}Al_{10}$ and $Ti_{70}Sn_{16}Al_{14}$.

TABLE 2

| Ultrasonic Young's Modulus (GPa) | Atomic Composition | Indentation Character n = normal; o-odd |
|---|---|---|
| 207 | $Ti_3Sn$ | n |
| 190 | $Ti_{36}Cr_{54}Nb_{10}$ | n |
| 150 | $Ti_{36}Cr_{54}Zr_{10}$ | n |
| 120 | $Ti_{87}Sn_{13}$ | n |
| 106 | $Ti_{70}Sn_{16}Al_{14}$ | o |
| — | $Ti_{36}Cr_{54}Al_{10}$ | n |
| — | $Ti_{72}Sn_{18}Al_{10}$ | o |
| — | $Ti_{75}Sn_{21}V_4$ | o |
| 77* | $Ti_{80}Sn_{20}$ | o |
| 55* | $Ti_{78}Sn_{22}$ | o |

What is claimed is:

1. A method for controlling emission or reflection of acoustic energy which comprises forming an article with a surface comprising, a titanium-tin alloy containing from about 13.5 to about 24.5 atom percent tin, the balance essentially titanium or a titanium-chromium alloy containing from about 52 to about 56 atom percent tin, from about 8 to about 12 atom percent aluminum, the balance essentially titanium.

2. A method according to claim 1 wherein the alloy is a titanium-tin alloy comprising from about 16 to about 23 atom percent tin.

3. A method according to claim 1 wherein the alloy comprises from about 53 to about 55 atom percent tin, up to about 10 atom percent aluminum, and the balance essentially titanium.

4. A method according to claim 1 wherein the alloy comprises about 75 atom percent titanium, about 21 atom percent, and about 4 atom percent vanadium.

5. A vibration damping article of manufacture having a surface comprising an alloy according to claim 1.

6. An acoustic energy absorbing article having a surface comprising an alloy according to claim 2.

7. An acoustic energy absorbing article having a surface comprising an alloy according to claim 4.

* * * * *